US008580383B2

(12) United States Patent
Schedler et al.

(10) Patent No.: US 8,580,383 B2
(45) Date of Patent: Nov. 12, 2013

(54) FIRST-WALL COMPONENT FOR A FUSION REACTOR WITH A HEAT SINK OF A COPPER ALLOY

(75) Inventors: Bertram Schedler, Reutte (AT); Thomas Huber, Breitenwang (AT); Anton Zabernig, Reutte (AT); Karlheinz Scheiber, Breitenwang (AT); Dietmar Schedle, Reutte (AT); Thomas Friedrich, Halblech (DE); Hans-Dieter Friedle, Häselgehr (AT); Sandra Mair, Reutte (AT); Nadine Wörle, Musau (AT)

(73) Assignee: Plansee SE, Reutte/Tirol (AT)

( * ) Notice: Subject to any disclaimer, the term of this patent is extended or adjusted under 35 U.S.C. 154(b) by 864 days.

(21) Appl. No.: 12/404,901

(22) Filed: Mar. 16, 2009

(65) Prior Publication Data

US 2009/0175400 A1 Jul. 9, 2009

Related U.S. Application Data

(63) Continuation of application No. 11/645,832, filed on Dec. 26, 2006, now abandoned.

(30) Foreign Application Priority Data

Dec. 23, 2005 (AT) .................................. GM886/2005

(51) Int. Cl.
*B32B 9/00* (2006.01)

(52) U.S. Cl.
USPC ............................ 428/408; 423/448; 977/742

(58) Field of Classification Search
USPC .................................. 428/408, 698; 165/185
See application file for complete search history.

(56) References Cited

U.S. PATENT DOCUMENTS

| 5,533,258 | A | 7/1996 | Rainer et al. |
| 5,740,955 | A | 4/1998 | Kneringer et al. |
| 5,988,488 | A | 11/1999 | Slattery et al. |
| 6,443,354 | B1 * | 9/2002 | Plochl et al. .................. 228/178 |
| 6,811,623 | B2 * | 11/2004 | Boegel et al. ................. 148/435 |
| 7,128,980 | B2 | 10/2006 | Schedler et al. |
| 2004/0195296 | A1 * | 10/2004 | Schedler et al. ............. 228/194 |

FOREIGN PATENT DOCUMENTS

| EP | 0552479 A1 | 7/1993 |
| JP | 7218670 A | 8/1995 |
| JP | 8301669 A | 11/1996 |
| JP | 2000226273 A | 8/2000 |
| JP | 2003-286558 A | 10/2003 |
| JP | 2004309485 A | 11/2004 |

OTHER PUBLICATIONS

European Search Report dated Apr. 18, 2012.

* cited by examiner

*Primary Examiner* — Maria Veronica Ewald
*Assistant Examiner* — Daniel H Miller
(74) *Attorney, Agent, or Firm* — Laurence A. Greenberg; Werner H. Stemer; Ralph E. Locher

(57) ABSTRACT

A first-wall component of a fusion reactor has a heat shield and a heat sink. The heat shield is formed of a material from the group of graphite material, carbidic material, tungsten and tungsten alloy. The heat sink is formed of a spray-compacted copper alloy.

11 Claims, No Drawings

FIRST-WALL COMPONENT FOR A FUSION REACTOR WITH A HEAT SINK OF A COPPER ALLOY

CROSS-REFERENCE TO RELATED APPLICATION

This application claims the priority, under 35 U.S.C. §120, of U.S. patent application Ser. No. 11/645,832, filed on Dec. 26, 2006, which claims the priority, under 35 U.S.C. §119, of Austrian application AT GM 886/2005, filed Dec. 23, 2005; the prior applications being herewith incorporated by reference in their entirety.

BACKGROUND OF THE INVENTION

Field of the Invention

The invention relates to a first-wall component of a fusion reactor, which comprises at least one heat shield of a material from the group comprising graphite material, carbidic material, tungsten and tungsten alloy, and a heat sink of a copper alloy.

A typical example of the use of such first-wall components is that of diverters and limiters, which are exposed to extremely high thermal loads in excess of 10 MW/m$^2$. First-wall components usually comprise a heat shield and a heat dissipating region. The material of the heat shield must be compatible with the plasma, have a high resistance to physical and chemical sputtering, a high melting point/sublimation point and be as resistant as possible to thermal shock. In addition, it must also have a high thermal conductivity, low neutron activation and adequate strength/fracture toughness, along with good availability and acceptable costs. Apart from tungsten, graphitic and carbidic materials best meet this diverse and to some extent conflicting set of requirements. Since the energy flows from the plasma act on these components over a long period of time, such first-wall components are typically actively cooled. The heat removal is assisted by a heat sink of a copper alloy, which is usually connected to the heat shield by a material bond.

In order to reduce stresses resulting from the different thermal expansion characteristics of the heat shield and the heat sink by plastic deformation, in the case where the heat sink consists of a high-strength copper alloy, for example Cu—Cr—Zr, the heat shield is connected to the heat sink via a pure copper intermediate layer. The pure copper intermediate layer in that case usually has a thickness of 0.5 to 3 mm.

First-wall components can be made in different structural designs. A distinction is drawn here between flat tile, saddle and monobloc designs. If a heat shield with a planar connecting area is connected to the heat sink through which coolant flows, this is referred to as a flat tile design. In the case of the saddle design, a heat shield with a semicircular recess is connected to a heat sink of a tubular form. The heat sink has in each case the function of establishing the thermal contact between the heat input side and the cooling medium and is thereby exposed to cyclical, thermally induced loads caused by the temperature gradient and the different coefficients of expansion of the elements joined together. In the case of the monobloc design, the first-wall component comprises a heat shield with a concentric passage. The heat shield is connected by means of this concentric passage to a cooling tube. Apart from the heat shield and the heat sink, first-wall components may also comprise further regions/parts, for example steel connection pipes.

First-wall components not only have to withstand thermally induced mechanical stresses but also mechanical stresses that additionally occur. Such additional mechanical loads may be produced by electromagnetically induced currents which flow in the components and interact with the surrounding magnetic field. This may involve the occurrence of high-frequency acceleration forces, which have to be transferred by the heat shield or else by the heat shield/heat sink joining zone.

The joining region between the graphite and the copper in this case represents the weak point of such material composites. A method for producing cooling devices with improved strength in the joining region is described in U.S. Pat. No. 5,533,258 and European patent EP 0 663 670 B1. There, copper in the molten state is brought into contact with the heat shield, elements of one or more metals of the IVth and/or Vth subgroups of the periodic table being provided in the joining region during the connecting operation. Following solidification and working of the solidified copper layer, the latter is connected to the heat sink, for example by an HIP or soldering process. A beam welding process may also be used.

However, on account of the geometrical conditions and the combinations of materials used, defects in the joining zone can only be detected by a corresponding amount of effort. For first-wall components, ultrasonic testing methods are used to do this. In the case of prior-art components, in ultrasonic testing the difficulty arises that, with the resolution accuracy required for this application, the materials used until now for the heat sink have a locally excessively differing sound attenuation.

In the case of the pulse-echo method used for this, the sound amplitude reflected from a defect is used as a measure of the size of the defect. In the case of the materials that are currently used and the critical defect sizes prescribed for use in nuclear fusion, it is not possible to distinguish unequivocally which intensity originates from the defect and which elements have been absorbed by the material of the heat sink. Therefore, the amplitude signal cannot provide a reliable indication of the defect sizes in the region of the joining zone. Against the background of a nuclear environment for such components, this gives rise to corresponding problems, in particular also because cracks/detachments can be regarded as possible triggers of a more major incident.

Therefore, before the joining process, the sound attenuation characteristic of the heat sink must be recorded. After the joining process, the intensity of the defect signal is once again determined and the sound attenuation characteristic of the heat sink is subtracted from it. The resultant amplitude level correlates with the defect sizes in the region of the joining zone. This testing method is laborious and susceptible to misinterpretation of the measurement results. In spite of many years of laborious development work in the field of first-wall components, the structural elements so far available do not optimally meet the set of requirements with respect to nondestructive testing.

SUMMARY OF THE INVENTION

It is accordingly an object of the invention to provide a first-wall component, which overcomes the above-mentioned disadvantages of the heretofore-known devices and methods of this general type and which can be nondestructively tested in a simple way.

With the foregoing and other objects in view there is provided, in accordance with the invention, a first-wall component of a fusion reactor with a heat shield and a heat sink. The heat shield is formed of a material selected from the group consisting of graphitic material, carbidic material, tungsten and tungsten alloy, and the heat sink is formed of a spray-compacted copper alloy.

When heat sinks of spray-compacted copper alloys are used, a differing sound attenuation does not occur.

Spray compacting is a method of producing semifinished metal products. It involves transforming a melt into the solid state, and at the same time creating a compact preform, via the intermediate step of atomization. This preform is a billet, which is further processed by conventional forming methods. Spray compacting is a method which is classified between powder metallurgy and extrusion.

It has been found that, when spray-compacted copper alloys are used, the local sound attenuations in the material are homogeneous to the extent that it is not necessary to record a sound attenuation diagram. It proves to be favorable in this case if the average grain size of the copper alloy is <50 µm. Furthermore, a narrow grain size distribution of the copper alloy is also advantageous. The $d_{50}$ and $d_{90}$ values thereby satisfy the following relationship: $d_{90} < 3 \times d_{50}$. The term $d_{90}$ is understood here as meaning that grain diameter that is not exceeded by 90% of the grains. By analogy, $d_{50}$ is understood as meaning that grain diameter that is not exceeded by 50% of the grains.

Even when spray-compacted copper alloys are used, it proves to be advantageous if they are precipitation-hardenable, this is the case for example with Cu—Cr—Zr alloys (DIN EN 2.1293). The typical chromium content in this case lies between 0.3 and 1.2% by weight and the zirconium content between 0.03 and 0.3% by weight, with the remainder made up by Cu and typical impurities.

As already mentioned, the spray-compacted billets are further processed by way of conventional forming methods such as extrusion or rolling. In order to achieve adequate homogeneity of the ultrasound picture, it is also favorable if the degree of deformation is greater than 70%. With the heat sink according to the invention, both first-wall components of the monobloc version and first-wall components of the flat tile version can be produced. Since the heat sink according to the invention has a high strength on account of the fineness of the grains and also the chosen alloying elements, it is advantageous if an intermediate layer of pure copper is arranged between the heat sink and the heat shield, serving to reduce stress by plastic deformation.

Apart from the advantage of simpler and more reliable nondestructive testing in the region of the joining zone, the spray-compacted copper alloys also have an extremely stable microstructure. For instance, spray-compacted Cu—Cr—Zr alloys only recrystallize at temperatures corresponding approximately to the solution annealing temperature. This microstructural stability is of special significance inasmuch as the required temperatures for the material bond between the heat shield and the heat sink lie in the range of typically 700° C. to 1000° C. While in the case of melt-metallurgically produced heat sinks this leads to recrystallization and grain coarsening, which is extremely critical in particular in the case of thin-walled, pressure-bearing structural parts, a microstructural change is avoided in the case of spray-compacted material.

Other features which are considered as characteristic for the invention are set forth in the appended claims.

Although the invention is illustrated and described herein as embodied in heat sink of a copper alloy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the following example.

DETAILED DESCRIPTION OF A PREFERRED EMBODIMENT

Example

A Cu—Cr—Zr alloy with a chromium content of 0.8% by weight, a zirconium content of 0.15% by weight and a remainder of copper and impurities was used to produce a first-wall component.

The preparation of the copper alloy thereby comprised the following steps:

First, the Cu—Cr—Zr alloy was inductively melted. The melt was atomized by means of nitrogen in an atomizing nozzle into droplets with a diameter of about 75 µm. The flying distance of the droplets from the atomizing nozzle to the substrate holder was chosen such that, when they impinged on the substrate holder, the droplets were in a state between solidus temperature and liquidus temperature. As a result, a billet with a diameter of about 470 mm built up on the substrate holder. The average grain size of the billet was in this case 100 µm. A dendritic structure and segregation in the interdendritic spaces was avoided by the high cooling rate. The further processing of the billet took place by extrusion and rolling. The cross section of the rolled bar, which was cut to a piece 500 mm long, was 30×65 mm. Examination of the grain size found an average grain size of 30 µm. 90% of the grains in this case had a grain size of <70 µm. By contrast with melt-metallurgically produced materials, the ultrasonic examination carried out on this Cu—Cr—Zr bar to determine the sound attenuation characteristic showed a homogeneous sound attenuation in the volume examined. Subsequently, a plate (65×500 mm) of pure copper 2 mm thick was placed on this bar. The assembly thereby obtained was positioned in a steel can. The can was sealed by TIG welding, evacuated after sealing and closed in a gastight manner. Subsequently, a hot isostatic pressing operation was carried out at 1000° C. and 1000 bar, whereby a defect-free material bond formed between the pure copper plate and the spray-compacted Cu—Cr—Zr bar. To check the defect detection limit, shallow bores in the diameter range between 2 and 10 mm and cross slits with slit widths likewise between 2 and 10 mm were made on the pure copper side. Both the bores and the cross slits reached up to the pure Cu/Cu—Cr—Zr joining zone. They therefore represent typical possible defects. In the subsequent ultrasonic examination, it was possible for all the defects introduced to be clearly detected, without the previously recorded sound attenuation characteristic having to be used for defect assessment.

For the ultrasonic testing, the composite body was subjected to ultrasonic transmission from the Cu—Cr—Zr side in the direction of the joining zone over the thickness of 30 mm by the pulse-echo method. This test was carried out by means of immersion methods. The following process parameters were chosen:

Test frequency: 5 MHz
Test head: Harisonic 13-0506-R
Oscillation diameter: 0.375"
Focusing: 2" SPM A metallographic examination subsequently carried out showed that there was virtually no microstructural change in comparison with the initial state.

We claim:

1. A first-wall component of a fusion reactor, comprising:
   at least one heat shield of a material selected from the group consisting of graphitic material, carbidic material, tungsten and tungsten alloy;
   a heat sink formed of a spray-compacted copper alloy having an average grain size of <50 μm; and
   a $d_{90}$ value and a $d_{50}$ value of a grain size distribution in said copper alloy satisfying the following relationship: $d_{90} < 3 \times d_{50}$.

2. The first-wall component of claim 1, wherein said copper alloy is precipitation-hardenable.

3. The first-wall component of claim 2, wherein said copper alloy consists essentially of 0.3 to 1.2% by weight of Cr, 0.03 to 0.3% by weight of Zr, and a remainder of Cu and customary impurities.

4. The first-wall component according to claim 1, wherein said copper alloy has a degree of deformation of greater than 70%.

5. The first-wall component according to claim 2, wherein said copper alloy has a degree of deformation of greater than 70%.

6. The first-wall component according to claim 3, wherein said copper alloy has a degree of deformation of greater than 70%.

7. The first-wall component of claim 1 being formed in a monobloc style or as a flat tile.

8. The first-wall component of claim 2 being formed in a monobloc style or as a flat tile.

9. The first-wall component of claim 3 being formed in a monobloc style or as a flat tile.

10. The first-wall component of claim 4 being formed in a monobloc style or as a flat tile.

11. The first-wall component of claim 5 being formed in a monobloc style or as a flat tile.

* * * * *